United States Patent [19]

Rosenthal

[11] Patent Number: 4,874,996

[45] Date of Patent: Oct. 17, 1989

[54] MULTIPLE HEAD WOODWORKING APPARATUS WITH AUTOMATED HEAD POSITIONING APPARATUS

[75] Inventor: Bruce C. Rosenthal, Sheboygan, Wis.

[73] Assignee: Kohler General Corporation, Sheboygan Falls, Wis.

[21] Appl. No.: 206,265

[22] Filed: Jun. 13, 1988

[51] Int. Cl.⁴ .............................................. G05B 19/18
[52] U.S. Cl. ..................................... 318/567; 318/603; 318/632; 144/2 R; 144/3 A
[58] Field of Search .................................. 318/565–573, 318/603, 632; 364/474.02, 474.09, 474.11, 474.12, 474.29, 474.32; 144/2 R, 3 R, 3 A, 3 B, 3 F, 3 E, 133 R, 144 R, 144 A, 144.5 R, 144.5 GT, 312.198 A, 378, 136 R

[56] References Cited

U.S. PATENT DOCUMENTS

| | | | |
|---|---|---|---|
| 2,939,367 | 6/1960 | Thomas | 144/3 A |
| 3,323,029 | 5/1967 | Joseph | 318/17 |
| 3,566,239 | 2/1971 | Taniguchi | 318/603 X |
| 3,584,284 | 6/1971 | Beach | 318/603 X |
| 3,586,951 | 6/1971 | Inaba | 318/632 |
| 3,622,766 | 11/1971 | David | 318/603 X |
| 3,668,377 | 6/1972 | Inaba et al. | 318/603 X |
| 3,814,153 | 6/1974 | Schmidt | 143/3 |
| 3,899,724 | 8/1975 | Colton | 318/162 |
| 4,072,887 | 2/1978 | Buschmann et al. | 318/603 X |
| 4,260,001 | 4/1981 | DeMuynck | 144/144 |
| 4,326,572 | 4/1982 | Ingram et al. | 144/3 B X |
| 4,354,798 | 10/1982 | De Muynck | 144/2 R X |
| 4,439,825 | 3/1984 | Donner | 318/603 X |

Primary Examiner—William M. Shoop, Jr.
Assistant Examiner—Paul Ip
Attorney, Agent, or Firm—Andrus, Sceales, Starke & Sawall

[57] ABSTRACT

A woodworking apparatus includes a computer based control unit for absolute positioning of tool units located in longitudinally spaced relationship to one or both sides of a conveyor. Absolute position sensors are connected to each axis of tool movement. Each axis has a separate permanent magnetic motor to position the tool on the corresponding axis. A multiplexing board selectively connects each sensor to the computer and a multiplexing position motor drive board selectively connects the corresponding motor in a closed loop absolute position control. Each position sensor includes spaced Hall cells secured to a movable sensor head, with limit signals hardwired via the multiplexing board directly to the control system. The PM motor is a low cost motor which rapidly drives the tool unit in accordance with the output of the sensor. The motor drive system includes a fast drive mode in an open loop for rapidly moving the several tool units and sequentially to slowly move the tools to the final position. Thus, the computer based control unit is provided with individual input commands for each axis of the tool unit and positions all the tool units in a matter of 3 to 8 minutes.

21 Claims, 3 Drawing Sheets

MULTIPLE HEAD WOODWORKING APPARATUS WITH AUTOMATED HEAD POSITIONING APPARATUS

BACKGROUND OF THE PRESENT INVENTION

The present invention relates to a automated positioning apparatus in a machine such as multiple heads woodworking apparatus including a plurality of relatively fixed work operating tools and particularly to positioning apparatus for positioning of the tools for operating on the work member.

In automated woodworking machines for forming and shaping the contour and configuration of a wood member, a substantial plurality of woodworking tools are mounted in predetermined positioning in spaced relation to a work conveying unit. Each of the many tools is accurately positioned for working on the wood member as it passes the tool station. The work is carried by an appropriate transport or conveyor unit sequentially past the tools. In various applications, in excess of 50 different tool axii at the work stations are provided for properly locating the individual tools and thereby creating defined shaping and forming of the various surfaces and edges of the wood product during a single cycle through the machine. Various tools are inventoried and mounted at each station in order to produce various profiles. Thus, cabinetry panels, doors, windows and the like are typical elements which are processed through relatively high speed woodworking and shaping machines. Such machines are relatively high production machines. The prior art machines use precision motors interconnected through precision lead screws positioning devices and the like for accurately setting of the tool in a preset operating position or in position to move relative to the work. The tool may in special instances have some limited movement with respect to the work as the work moves past the station, but generally the tools are held in a fixed position relative to the moving work. Generally, such machines are expensive complex machines in order to provide a long life and reliable operation. Each head is individually preset in the particular required position for the particular design and work of the wood product required. Accurate positioning of all the tools is a significant aspect of the machine design. Individual manual setting of the various cutting tool may require an excess of 30 to 40 minutes set up time. Further, the individual adjustment is operator dependent and may therefore result in some waste or waste product as the result of human error. U.S. Pat. No. 3,814,153 which issued June 4, 1974 discloses a special woodworking apparatus in which a succession of work pieces are transported by a conveyor unit past a plurality of preset woodworking stations and tools. As more fully disclosed therein, the various working tools illustrated are positioned to a particular pattern to provide a path related to a predetermined shaping of the edges of the woodwork pieces as it travels longitudinally past the tools. Other tools are shown for other shaping of the workpiece, or otherwise changing the workpiece as by cutting, providing appropriate recesses and openings through boring and routing tools. Each of the tools has an appropriate electric motor, and is mounted on a carriage for proper positioning relative to the work.

U.S. Pat. No. 3,323,029 discloses a single portable positioning device specially constructed for selective coupling to each of the tools in a multiple headed machine. The tool is selectively connected for each machine tool for actuating a particular motor and then manually operates the system sequentially to adjust the tool to an exact postion. When the adjustment is complete, the adjustor unit is unplugged from the machine and moved to the next station. This however continues to use the same basic approach of a single individual control of each of the heads with a manual adjustment.

Generally, 3 to 5 axis machine tools and woodworking machines are used in production of shaped wood parts. Such machines will cost anywhere from $100,000.00 to $150,000.00 with the cost directly related to the number of different tool stations. Thus the cost of the stations and particularly the adjustment means is very significant. Further, difficulty in the accuracy of the system with present day positioning tends to vary with the age of the machine. The repeatable operation of the machine then becomes difficult and unreliable unless an expensive update of the drive systems as well as the tooling is provided.

Further, existing machines in the marketplace, which do not include the most current technology, are difficult and expensive to retrofit to the most current technology because of the use of relatively expensive drives, mountings and the like.

Although a very substantial number of woodworking machines and the like where a multitude of axii must be positioned are commercially in place as the result of the productivity of such machines, there is a continuing need and request for a woodworking type machine having a simpler and particularly less costly position control system to permit the more rapid and effective set up of the machine for establishing a given sequence of operation of the sequential tooling.

An absolute positioning control system with a computer based controller is disclosed in an article entitled "Computer Driven Tenoner is User Friendly" published in the January 1987 issue of "Furniture and Manufacturing Management", discloses a multiple tool wood working apparatus in which each tool element is provided with an absolute positioning drive in combination with a feedback system having an absolute position measuring device which permits simplification of the control system. Each tool axis includes a separate linear measuring device having one component fixed to the moving head and the other part fixed to the machine support structure to obtain an absolute position signal. A special precision type of a lead screw and drive connection is not required because the positioning is to an absolute position and the measuring device establishes an absolute position signal of the positioning of the head. The measuring device is connected to a computer based controller having the axis information for the tools stored in a computer program for positioning of the tools.

SUMMARY OF THE PRESENT INVENTION

The present invention is particularly directed to a woodworking apparatus including a computer based control unit for absolute positioning control and including an apparatus for rapid and cost effective tool positioning of woodworking apparatus tools. In accordance with the present invention, the control unit is coupled through a multiplexing system including a multiplexing board to the several heads and a multiplexing drive board connected to each motor. Each of the position sensor units is also provided with a limit sensor such as a Hall cell effect sensor secured to the movable sensor head with the limit signal transmitted via the multiplexing circuit board directly to the control system. The output of the control unit is coupled to the motor through the multiplexing driver board with a suitable direction and speed control provided for connecting of a D.C. power supply to the motors for operation thereof.

The apparatus with the substantial number of heads has the head information rapidly multiplexed to the computer which can effectively continuously monitor and control the positioning motors for positioning of each tool along any one or more of the assigned axis at the several tooling stations, and in machines having axii in excess of 50. In accordance with another aspect of the invention, a permanent magnet motor (PM motor) is used for each axis. The permanent magnet motor is a low cost motor which a simple PM motor may thus rapidly drive the unit toward the desired position by appropriate operation of the motor to provide the desired position location in accordance with the output of the measuring device. The motor drive may include a slow drive mode as the tool approaches the final position. Permanent magnet motors provide a small, inexpensive but rugged drive system for positioning of the various heads.

In a particular construction, the electronic measuring unit includes a rail secured to a beam and a head slidably mounted on the fixed rail. The head is an electronic device activated by the rail and establishes a digital readout in accordance with the linear signal relative to the position of the head on the rail. The electronic head provides a direct visual readout of the electronic head position and thereby the tool, as well as the digital output signal corresponding to the tool movement with respect to a reference position. In a practical construction, the head can be set to have a zero reference reading at any location on the electronic measuring rail. The output digital reading provides an output with respect to the direction and the magnitude of the movement with respect to the zero reference signal or position. The electronic head includes a serial output port which is connected to a logic controller such as a microprocessor unit. The microprocessor unit establishes a forward or reverse motion signal based on an absolute input signal and the absolute position signal of the electronic head. The head is thus positioned in accordance with the comparative digital signals for rapid, accurate and precise positioning of the electronic head to an absolute position and thereby the tool.

The motor control can incorporate a closed loop system, with absolute positioning, or a sequential positioning using a rapid open loop, high speed positioning followed by the closed loop system. In accordance with a preferred feature of the present invention, the control unit simultaneously establishes an initial high speed positioning of all the tools, which can be established by an appropriate timing in an open loop control, and subsequently provides for sequential final precise positioning of each tool in a closed loop system. The inventor has applied the application to a wood working machine having an excess of 50 axii, and through simultaneous and sequential tool positioning operations provided set up of the unit in approximately 3 to 8 minutes in contrast to the 30 to 40 minutes required for manual set up of the machine in accordance with past conventional practice.

Thus the logic controller is provided with individual input commands for each axis of the tool unit and for driving each of the corresponding motors. The controller is then actuated in an automatic mode to provide the desired positioning of all of the tool unit.

In a further optional preferred enhancement of the overall system, a special programming computer can be provided for computer aided design of a part and generating a special application program. Thus, the operator can generate within the programming computer all of the critical information for positioning the axii of the various tools. The operator views the part and presets the particular cuts and dimensions and enters all the dimensional information into the computer. The computer builds a file of the critical set up numbers which may include tool set up, offset and the initial set up equation, tolerances and the like to compensate for differences in the tools from an ideal tool arrangement. After the total file for any given part has been created, the total program file can be transfered from the personal computer to the controller or to a memory file with a suitable recall number or other code for subsequent recall and transfer to the controller.

The microprocessor can be provided with various communication links to exchange information with one or more computers as well as providing for output of various information to other systems. For example, it may be desired to maintain the operating record of the machine. The microprocessor can readily transmit information with respect to the particular part number operated, the up time of the machine, the number of parts processed, and the like. All such information can be accumulated and sent to the personal computer. The computing system of the present invention further can be thus connected to a host computer forming a part of a total master system of an overall MIS control system for a factory or the like.

The present invention thus provides a low cost multiple head woodworking machine permitting rapid and accurate setup of the machine as well as permitting direct programming and reprogramming of the part to be formed on the machine.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings.

DESCRIPTION OF THE ILLUSTRATED EMBODIMENT

Figure 1:
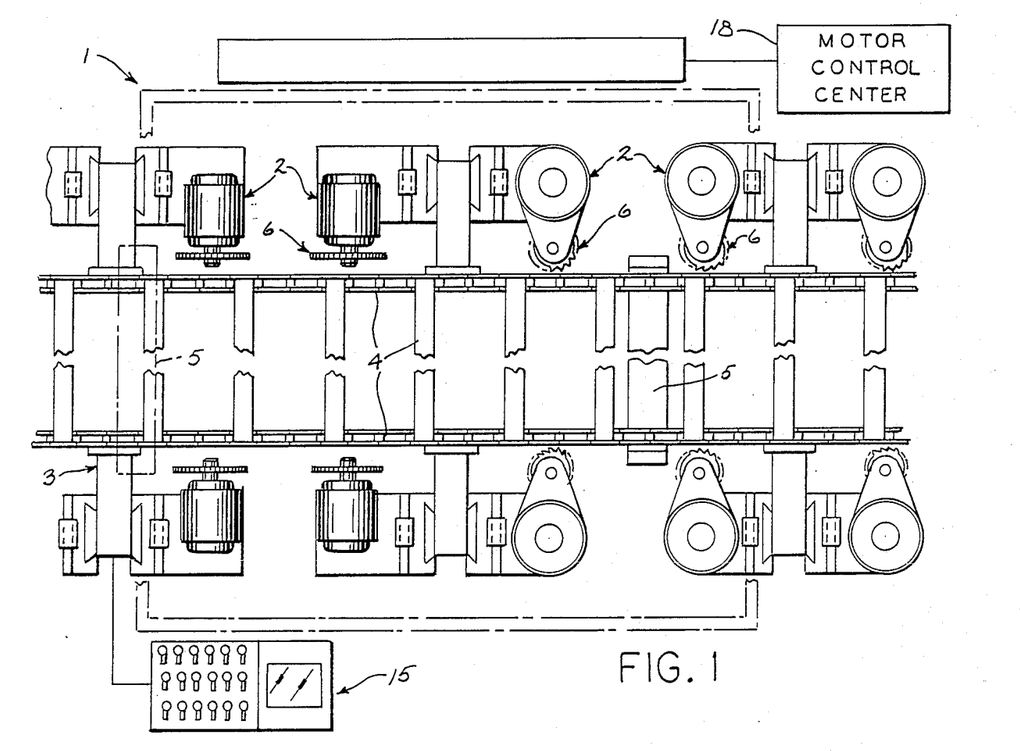
FIG. 1 is a plan view of a woodworking machine incorporating a positioning control system in accordance with the present invention.

Referring to the drawing and particularly to FIG. 1, a multiple tool woodworking machine 1 is shown including a plurality of working and shaping stations 2.

The machine 1 includes an elongated support frame 3 with the stations 2 located in aligned spaced relation along the frame. A conveyor 4 extends throughout the length of the frame 3 and transports successive work or part members or parts 5 in sequence through the several stations 2 and past a working tool 6 provided at each station 2. The conveyor 4 is a known chain-type unit constructed to firmly clamp or otherwise fixedly support part 5 for shaping the edges. In a typical woodworking machine, the sequential tools may require tool movements on a substantial member of axes. For example, a plurality of rotary cutters and other surface working tools 6 are spaced longitudinally of the conveyor 4. In a double ended machine tool, stations are provided to both sides of the conveyor as shown. In a single ended machine, tool stations are provided to one side of the machine. The tool 6 at any station may have a vertical axis, a horizontal axis and a tilt axis for accurate positioning of the tool relative to the work part 5 as the latter moves past the tool. Each axis includes a separate drive motor 7 for separately moving the tool 6 relative to the work conveyor 4 to the desired position for shaping the wood part 5. Generally, each tool will include a compound slide support for vertical positioning on a vertical axis and for horizontal or laterally position on a horizontal axi, as more clearly shown in FIG. 2a and more fully described in the copending application of Bruce C. Rosenthal et al and entitled "Woodworking Machine Having A Plurality Of Sequentially Operative Multiple Tool Units" and filed on even date herewith. A conventional drive for each axis includes a motor-driven screw 8 secured to a machine support structure 8a and a cutting head slide 9 fixed to the tool 6 for linear or tilt positioning of the attached tool. For purposes of description, a single linear movement is particularly shown and described for purposes of simplicity and clarity of explanation. Other axis would be similarly constructed. The slide, machine screws, followers and the like which are used in machines of current design as well as older existing machines have rather significant tolerances. Although the tolerances are generally acceptable in the processing of the work, initial set up of the various tools of the machines is quite difficult and is generally time consuming and costly. In setup machines with encoder type feedback systems, the normal tolerances would generally not be acceptable and special machine screws would generally be required. This special construction would require costly construction of the parts and machine, as well as corresponding subsequent maintenance expense. In any event, the initial set up of the many axii, with a high cost per axis, would produce a costly apparatus having a rather limited acceptance in the mass production of shaped wood members.

A linear measuring unit 10 is connected to the cutting head slide 9 and to the machine frame structure 8a. The measuring unit 10 is an absolute electronic scale unit which is used as a direct position sensor establishing an absolute measure of the position of the tool. Each tool axis has a separate measuring unit 10 including a capacitive scale rail 11 affixed to the tool slide 9 and an electronic reading head 12 fixedly mounted to the machine frame structure 8a. The head 12 is mounted in a precise position relative to the path of the work member 5 past the work station 2 and each tool 6. The position of the scale member 11 provides a corresponding readout of its positions relative to conveyor 4, this establishes a direct absolute readout of the position of tool 6. Head 12 is an electronic reading device which provides a direct digital readout of the position of the tool 6, and includes a digital display 13 of such position to the operator. The head 12 further includes an output cable 14a including a signal line 14 establishing an electrical signal directly proportional to the absolute position reading. The output line 14 connects the part to a microprocessor based positioning control unit 15 providing a logical control for positioning of the various tools 6.

The measuring unit 10 may be any suitable electronic unit having a head mounted for relative movement over a scale and producing an electrical output signal which is directly related to the position of the head 12 on the scale 11. Suitable commercial units are available. The Fowler Company produces a Fowler-Sylvac Ultra Cal II electronic caliper incorporating an electronic scale unit particularly adapted to application to the present invention. ST Industries, Inc. of St. James, Minn., also produces an electronic scale unit.

The control unit 15 is programmed to produce separate electrical command signals for each tool axis. Thus, driving the tool 6 to establish a match between the output of the readout head 12 and the command signal results in direct positioning of the tool 6 relative to the conveyor 4. A sequential, multiplexed system permits a rapid computer-based positioning system. In accordance with one aspect of this invention, the many tools 6 are rapidly and simultaneously driven to establish a close position of each tool 6 on the corresponding axis, followed by a sequential precise setting of each tool axis. In this manner, a 30 to 80 axii wood working machine can be set up in about 3–8 minutes in contrast to the usual 30–40 minutes required with present day positioning technology in the wordworking machine art.

Generally, the control unit 15 includes a command input 16 connected to an operator control 16a shown including a computer input terminal 17, and a portable hand-held input terminal 18. The input terminal 17 actuates the control unit 15 for individual automated setting of the several tools 6 under a computer program which includes selection of various tool setting programs and the like. The hand-held input terminal 18 is used by the operator for on-sites control of the tool positioning.

The control unit 15 includes a motor controller 19 which is adapted to be appropriately connected to energize the motors 7 for positioning the several tools 6. The motor controller 19 is connected to the motor individually and in sequence for precise setting thereof or alternatively is connected to simultaneously drive the motors for rapid positioning of the several tools prior to the precise tool positioning.

More particularly, the control and interface uses readily available components and elements. Commercially available microprocessors are available for proper processing of the position command signals and the tool position measuring unit signals to actuate the axis position motors 7 for each tool 6.

Generally, the microprocessor based control unit 15 and particularly terminal 17 includes a display unit 21 and keyboard 22 coupled to a central processor 23. In accordance with the present invention, the outputs of all the measuring units 10 are multiplexed and converted and then transmitted to the central processor 23 which processes the input command signals and the measured signals and generates the output signal at line 20 to the motor drive unit 19 for driving the tool positioning motors 7. The processor 23 includes a fixed operating program for executing a controllable run program for positioning the tools 6. The operator can manually set the run program through the keyboard unit 22. A menu driven write program prompts the user/operator through the necessary steps to directly position each tool 6 in accordance with operator inputs for each tool axis of the machine. The completed or final "run" program can be executed in an automatic set-up routine resulting in positioning of the entire machine in several minutes. Axis information can also be written or rewritten using the portable terminal 18.

In addition, the processor 23 is shown connected to an auxiliary programming computer 24 such as a personal computer with a special applications program generator. The user/operator can produce, manage and store set-up information in a memory of the auxiliary computer 24. The programmed generator presents the part 5 to be formed in its display 20 and requires the introduction of all the part dimensions via its keyboard 26 to form the finished part. The part 5 itself may be graphically presented in a two dimensional display, with the associated dimensions displayed as the user inputs such dimensions, for ease and accuracy of the operator use. The computer 24 processes the inputted information and establishes a file including the critical set-up numbers needed for setting the machine to produce the particular part. A substantial number of part files can be created and stored in the peripheral computer. Each file has a related part number which can be down loaded directly into the processor 23. A series of files may be down loaded to the processor 23 for producing a series of parts without further interfacing with the auxiliary computer, thereby freeing the auxiliary computer for other usuage.

Further, once the machine 1 has been set for a particular part, the operator may manually change one or more dimensions through the machine keyboard 22 or the portable terminal 18. The diminsional parts information or the modified part may be uploaded and stored in the peripheral computer 24 with its own part number.

The peripheral computer 24 and the processor 23 may be further interfaced to exchange other information. For example, the woodworking machine 1 runs can be recorded in real time by the processor 24 and accumulated information transmitted to the auxiliary computer 24. The computer 24 can in turn be connected to a main host computer, not shown, of an overall linked business information and computing system.

Figure 2:
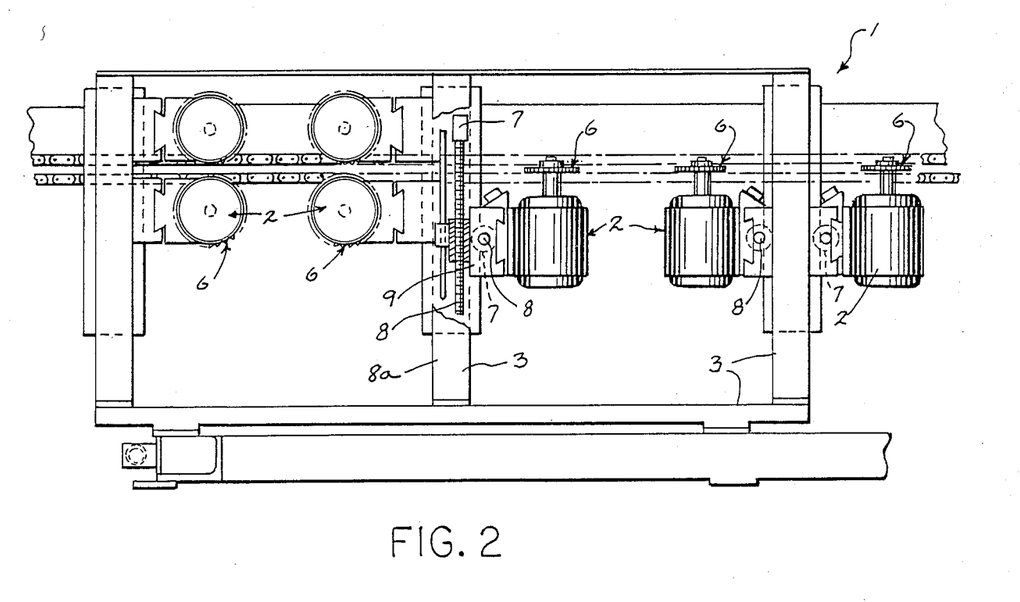
FIG. 2 is a side elevational view of the machine shown in FIG. 1.

More particularly, a block diagram of the control unit and system 15 including processor 23 and auxiliary computer 24 is shown in FIG. 2.

The central processor 23 is on 8052 A H microprocessor and typically includes a 7252 controller made by Encoder Product. The controller has an appropriate command input 28 from the operator control terminal 19 or the hand-held terminal. The processor 23 has an input 29 connected to receive the absolute position signals from the various scale heads 12 of unit 10. In accordance with this inventor, a multiplexer 30 includes a plurality of input lines 31, connected one to each of the signal lines of the head cable 14 of the scale heads 12. A common output line 32 of the multiplexer 30 is connected to the feedback position signal line 29 of the processor via an interface converter 33 shown as an RS232 ASCII converter. The processor's fixed operating program sends a transmitting signal via a line 34 to the multiplexer 30 to select the head signal lines 14 and to the converter 33 via a line 34a requests a transmission. The head signal at the common line 32 is then transmitted to the processore 23.

The signal from each measuring head 12 is connected by a suitable amplifier 35 to one of the multiplex input lines 31. Amplifier 35 is secured to the head 12, as shown in FIG. 2. The amplifier 35 suitably shapes and amplifies the scale head signal to an appropriate signal for transmission to the processor.

Figure 2A:
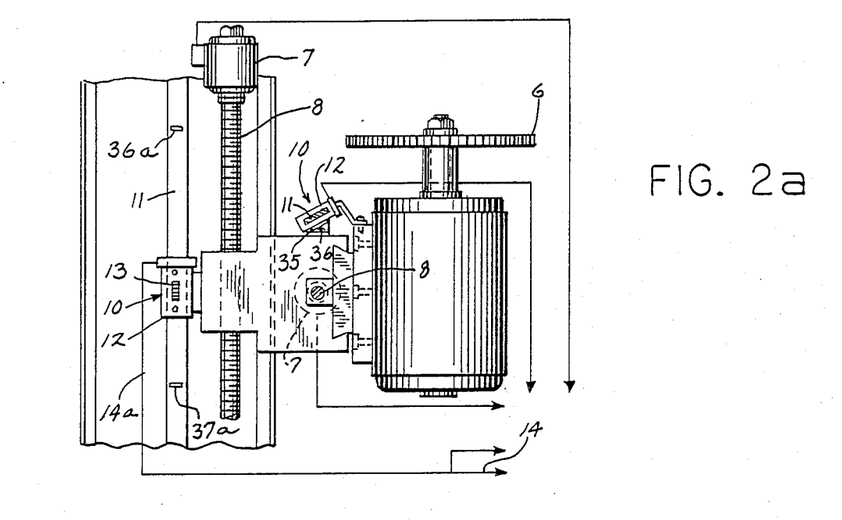
FIG. 2a is a fragmentary view showing a horizontal and vertical side support.
Figure 3:
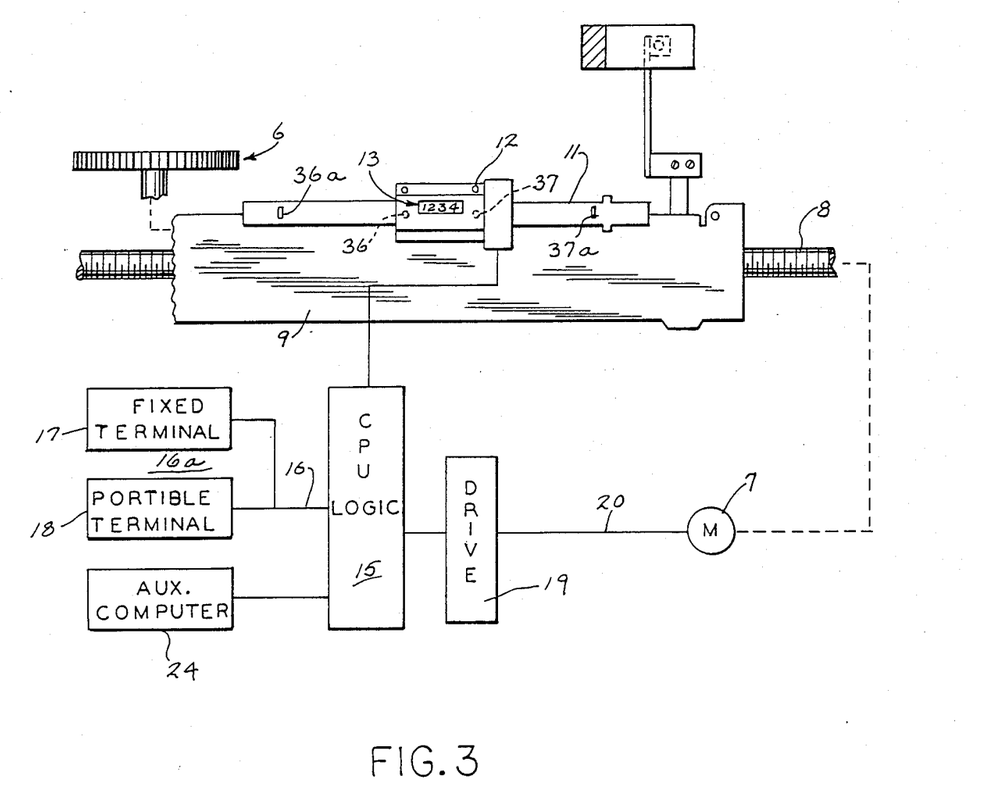
FIG. 3 is an enlarged fragmentary view of a position sensor unit shown in FIGS. 1-2a coupled to a control unit for positioning the tool.
Figure 4:
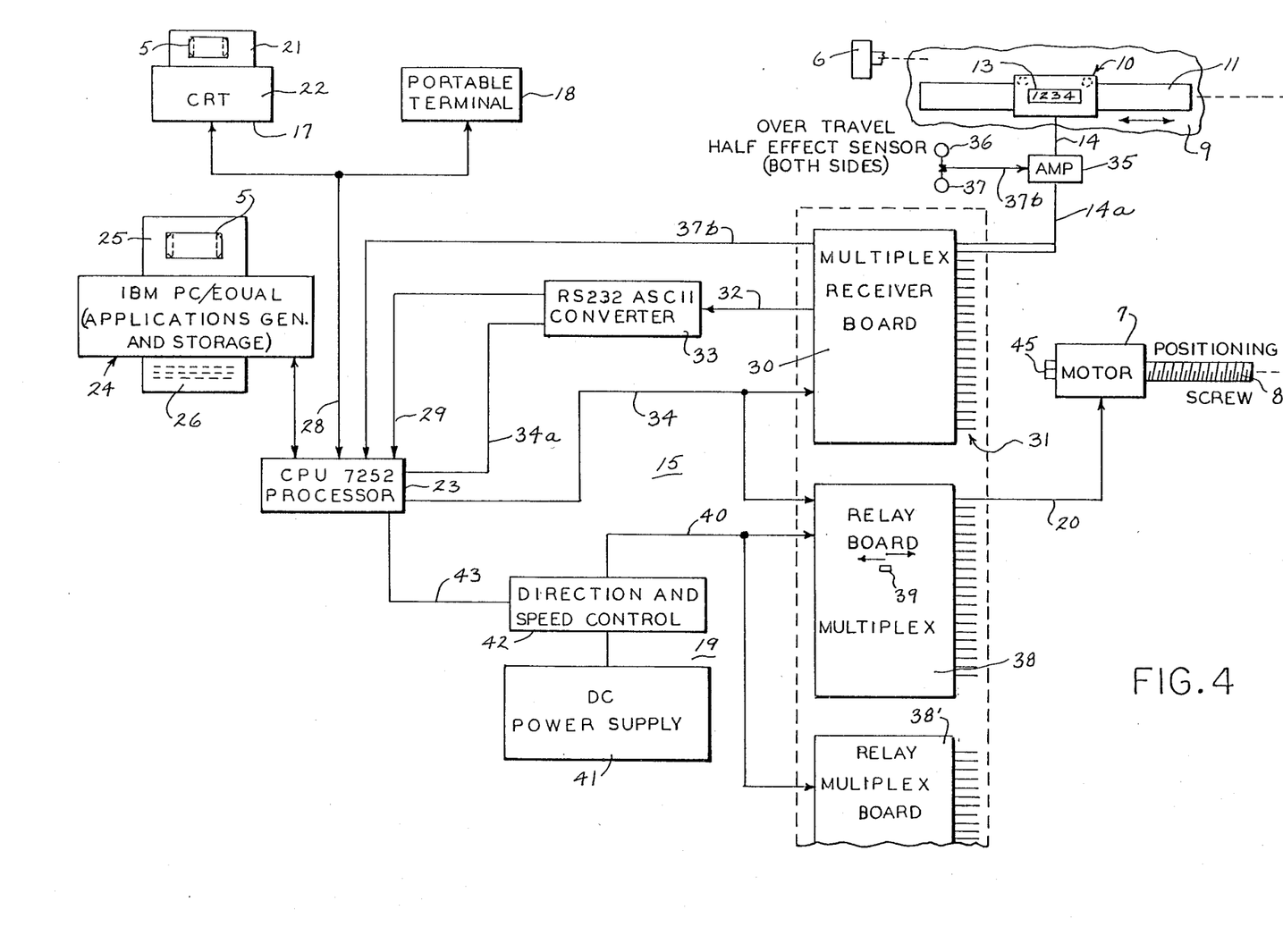
FIG. 4 is a tool diagram of tool units shown in FIGS. 1-3.

Over-travel signal sensors 36 and 37 form position limit sensors and are coupled to transmit an over-travel or limit signal at each end of the scale 11. The sensors 36 and 37 may be Hall effect sensors, with the Hall cells 36 and 37 secured to the sensing head 12 as shown in FIG. 2a and with magnets 36a and 37a secured to the rail in proper spaced relation for sensing over-travel of the sensor 36 and 37. If the scales move past a limit position, indicating a faulty position of the tool 6, a signal is transmitted via the amplifier 35 which can be used to trigger an alarm device or the like. The limit signal output of each cell 36 and 37 is hard wired to the amplifier 35 and to the multiplexing board via a line 37b of cable 14a for direct signal transmission to the processor 23. The signal is suitably configured and the processor 23 directly responds to a limit signal to provide an alarm, take corrective action, or the like. The operator can properly service the system to avoid improper machine operation and production of defective products.

The limit sensors may also be used to set the zero reference by locating the actuating magnets at or slightly beyond a desired zero reference. In such a system, the apparatus would be designed such that the tool would not in practice be set to move to the zero reference.

As more fully illustrated in FIG. 2a, each Hall cell 36 and 37 is mounted directly to the moving head unit. The Hall cell is thus connected to the amplifier 35 which is also mounted to the head. The signal output of the head is connected to the amplifier. The head mounting of the Hall cells and the amplifier establishes a minimum circuit connection between the signal sources and the amplifier 35. This minimum circuit connection establishes excellent noise immunity such that the small signal of the typical sensor unit can be appropriately used in a working environment for woodworking apparatus. The amplified signal is transmitted from the head to the controller. Noise signals and interference signals on the lines will not affect the amplified signal from the sensor and the signal at the controller provides the desired accurate information for the precise control of the woodworking apparatus.

The processor 23 upon operator or programmed command sequentially and repetitively interrogates each measuring unit 10 for the position signal of the corresponding head 12 in sequence through appropro- ate repetitive sequencing of the multiplexer.

The multiplexing select lines 34 from the processor 23 are connected to multiplexing board 38 to sequentially activate the motors for the several axii in accordance with the multiplexing of the corresponding head 12 for the same axis. The board 38 is diagrammatically shown as a motor select relay board 38 for selectively activating the several positioning motors 7. Where a substantial number of areas are controlled a plurality of like relay boards 38' are provided, as shown. The motor relay multiplex board 38 is shown as a typical relay board. A separate relay unit 39 connects the individual motor drive lines 20 for the several motors to a common input power line 40 for corresponding energization of the connected motor. The processor activates the several relays through the select lines 34 of the multiplexing system in accordance wtih the corresponding connection of the sensing head 12 for that motor.

Although any positioning motor can be used including conventional servo motors, the inventor found that a permanent magnet motor provides a particularly unique and satisfactory motor. Such motors have not been generally used in control systems or positioning systems because of the inaccuracies. However, with the present absolute positioning system, applicant has found that the permanent magnet motor provides a very inexpensive motor for the present application. The permanent magnet motor merely requires the two leads to provide direction and control by changing of the wire polarity connections to the D.C. power supply 41. The polarity is readily controlled by the controller. The permanent magnet motors are therefore easily switched and multiplexed and thus are particularly and uniquely adapted to application in the present invention using the absolute position control. The motor power supply 41 is shown connected to the input power line 40 via a processor driven direction and speed control module or unit 42 for proper positioning of the selected tool 6. The motor control unit 42 has a control input 43 connected to the processor 23 which sets the control for proper directional movement of the motor 7 and tool 6, as well as the motor speed. Thus, the unit 42 may reverse the line connection for direction control.

In accordance with the invention, the tools are positioned in a two-step process.

During the initial high speed positioning mode, the motors 7 are simultaneously energized under a high speed mode for a time period to rapidly move all the tools 6 to substantially the working position. During the final positioning mode, the motors 7 are individually and sequentially energized under an absolute position control to move and precisely set the tool 6. The slower movement results in establishing a precise match between the position command signal and the positioning head signal for each tool 6, and thereby insure precise positioning of the tool relative to the conveyor and the part 5.

More particularly, the rapid initial positioning of the tools is established preferably using a time based open loop drive system. In this mode, the computer reads the position of each tool. The present position is compared with the desired programmed final position. The time necessry to move the tool to the final position is determined by the processor and the initial drive for the corresponding motor established in an initial mode program. The processor can read the position and determine the necessary timing essentially in seconds, even in machines using a substantial number of tools. The controller then simultaneously drives the several motors for a corresponding timed period to establish the initial position with the tools spaced slightly from the desired final position. Upon completion of the initial setting with the tools spaced from the final position, the program automatically switches to sequential setting of the tools in a closed and absolute positioning loop drive system. In this mode, the tools are moved to the final position until the correct match between the programmed position and the output of the absolute positioning reading head is established. The several tools are rapidly but precisely set in the necessary affixed cutting position for forming of highly accurately profile cuts.

Further, in accordance with a further aspect of the invention, the permanent magnet motor is specially constructed with the drive shaft exposed for direct motor manual operation. In the illustrated embodiment of the invention, the motor shaft protrudes from the back side of the motor. The outer end 45 of the shaft is formed to receive a suitable wrench structure for manual turning of the motor. This provides a redundancy positioning control in the event the automatic system should fail or manual adjustment is desired for any particular reason.

Thus, the present invention provides a particular practical implementation of a computer based control using an absolute positioning sensing system where a very substantial number of axii must be adjusted and preset in a minimum timed period.

Various modes of carrying out the invention are contemplated as being within the scope of the following claims particularly pointing out and distinctly claiming the subject matter which is regarded as the invention.

I claim:

1. A multiple head woodworking apparatus, comprising a conveyor means including support means for fixedly supporting a series of wood parts and sequentially moving the support means past a plurality of spaced working tools supported in fixed orientation with respect to said parts, means supporting each of said tools for selective linear movement relative to said conveyor means and having a plurality of linear axis of movement, motors for positioning each of the tools, an absolute electronic scale unit for each axis including a scale having a detectable indicia thereon and a relatively moving electronic readout head coupled to said scale and establishing an output signal directly related to the absolute position of said head on said scale, relative movement of said scale and said readout head in accordance with the positioning of said tool establishing an absolute position signal of the corresponding tool, a control unit having a command signal input, a multiplexing means connected to said heads and to said motors to receive signals corresponding to said position signals and connected to each readout head and to said motor drive unit for positioning said tool on each axis in accordance with a predetermined signal match between said signals.

2. The woodworking apparatus of claim 1 wherein said control unit includes means to simultaneously energize said motors at a first speed to approach a signal match, and means to subsequently sequentially energize said motors to establish said signal match.

3. The woodworking apparatus of claim 2 wherein said control unit includes means to energize each of said motors for a time period to approach a final set position and subsequently energize said motor in accordance with the absolute position of said tool to set the final position of the tool.

4. The woodworking apparatus of claim 1 including limit sensor means secured each to said head unit and responsive to limit movements of said tool, an amplifier secured to said head and having input means connected to head unit and to limit means and having output means connected to said control unit.

5. The woodworking apparatus of claim 1 wherein each of said motors is a permanent magnet motor.

6. The woodworking apparatus of claim 4 wherein each of said permanent magnet motors includes an exposed output shaft for manual position of the motor.

7. The woodworking apparatus of claim 1 wherein said control unit includes a central controller programmed to position each of said motors to a fixed operating position, said multiplexing means includes a multiplexer having selection means connected to said controller for actuating input lines connected one each to each of said axii for receiving said position signals.

8. The apparatus of claim 7 including a common motor drive means, said multiplexing means including a motor drive multiplexer having selection means connected to said controller for selectively coupling said motors to said common drive means, said controller connected to said common drive means to control the direction and speed of positioning each said motors.

9. The woodworking apparatus of claim 7 including an auxiliary computer having a program generator and a manual input keyboard for generating a complete setting of all said tool supports for generating a particular part and having a file storage means for storing a plurality of work defining programs each of which is adapted to be dimensionally specified, means connecting said auxiliary computer and said control unit for down loading said dimensionaly specified program to said processor.

10. The woodworking apparatus of claim 7 including limit sensor means secured to each head unit and establishing a limit signal in response to abnormal movement of said tool support, and hard wired means connecting said limit sensor means to said controller.

11. The apparatus of claim 7 wherein said processor includes an operating program for setting said tool supports and a memory for receiving a parts program for execution and establishing particular setting of said tool supports, a fixed operator terminal for establishing a parts program in said processor, and a portble terminal connected to said process for on-site modification of the setting of said too supports.

12. The apparatus of claim 1, wherein said control unit includes a processor having an operating program for setting said tool supports and a memory for receiving a parts program for execution and establishing particular setting of said tool supports, a fixed operator terminal for establishing a parts program in said processor, and a portable terminal connected to said processor for on-site modification of the setting of said tool supports.

13. The woodworking apparatus of claim 7 wherein said control unit includes means to simultaneously energize said motors at a first speed to establish said signal matches, and means to subsequently sequentially energize said motors to establish said signal matches.

14. A multiple head woodworking apparatus, comprising a conveyor means including support means for fixedly suporting a series of wood members and sequentially moving the support means through a plurality of work stations, each of said stations having a surface working tool support for shaping the surface of the wood members, a machine frame structure, means supporting said tool support on said frame structure for selective linear movement relative to said conveyor and having a plurality of linear axis of movement for setting the tools in a final set position for working the wood members, separate permanent magnet motor means for positioning each of the tool supports, a linear electronic scale unit for each axis for each said tool support and each scale unit including a linear scale and a relatively moving electronic readout head coupled to said scale and establishing an output signal directly related to the absolute position of said head on said scale, means fixedly supporting one of said scale on said readout head to said corresponding tool support and means supporting the other of said scale on said readout head to said corresponding frame structure whereby the output of said head establishes an absolute position signal of the corresponding tool support, a control unit having a command signal input adapted to receive signals corresponding to said position signal of each said head and having an input connected to each said readout head, a multiplexing means for selectively connecting each of said heads to said input, said control unit having an output for connection to each said motor for energizing said motor, a motor multiplexing means connected to said output of said control unit and to said motors and responsive to a match of said signals to terminate energizing said motor and establish said final set position.

15. The apparatus of claim 14 wherein said control unit includes a D.C. power supply, and a speed and directional controller connected between said supply and said motor multiplexing means.

16. The woodworking apparatus of claim 15 wherein said control unit includes means to simultaneously energize said motors at a first speed to approach a final set position, and means to subsequently sequentially energize said motors to establish said signal matches and said final set position.

17. The woodworking apparatus of claim 15 including limit sensor means coupled to actuate said head unit in response to abnormal movement of said tool support.

18. A multiple head woodworking apparatus, comprising a conveyor means including a support means for fixedly supporting a series of wood members and sequentially moving the support means through a plurality of work stations, each of said stations having a surface working tool support for shaping the surface of the wood members, a machine frame structure, means supporting said tool support on said frame structure for selective linear movement relative to said conveyor and having a plurality of linear axis of movement, separate motor means for positioning each of the tool supports, a linear electronic scale unit for each axis for each said tool support and each scale unit including a linear scale and a relatively moving electronic readout head coupled to said scale and establishing an output signal directly related to the absolute position of said head on said scale, means fixedly supporting said scale, said corresponding tool support whereby the output signal of said readout head is an absolute position signal of the corresponding tool support, limit sensor means mounted on said head unit in response to abnormal movement of said tool support to generate a limit signal, an amplifier mounted on said head and connected to said head and to said sensor means, a control unit having a command signal input adapted to receive signals corresponding to said position signal of each of said heads and having a position output connected to each multiplexer, said control unit having an output connected to each said motor for energizing said motor.

19. The apparatus of claim 15 wherein said motors are permanent magnet motors, said control unit includes a D.C. power supply, and having a speed and directional controller connected between said supply and said motors, said control unit connected to speed and direction controller for energizing said motors.

20. The woodworking apparatus of claim 16 wherein said control unit includes means to simultaneously energize said motors at a first speed to establish said signal matches, and means to substantially sequentially energize said motors to establish said signal matches.

21. The woodworking apparatus of claim 20 wherein said control unit energizes said motors at said first speed for a time period related to the distance to be moved to approach the final position.

* * * * *

UNITED STATES PATENT AND TRADEMARK OFFICE
CERTIFICATE OF CORRECTION

PATENT NO. : 4,874,996
DATED : October 17, 1989
INVENTOR(S) : Bruce C. Rosenthal et al It is certified that error appears in the above-identified patent and that said Letters Patent is hereby corrected as shown below:

Col. 11, line 22, delete "dimensionaly" and substitute therefor ---dimensionally---; Col. 11, line 33, delete "portble" and substitute therefor ---portable---; Col. 11, line 35, delete "too" and substitute therefor ---tool---.

Signed and Sealed this

Twenty-sixth Day of March, 1991

Attest:

HARRY F. MANBECK, JR.

Attesting Officer

Commissioner of Patents and Trademarks